(12) United States Patent
Baek et al.

(10) Patent No.: US 11,302,239 B2
(45) Date of Patent: Apr. 12, 2022

(54) DISPLAY APPARATUS AND DRIVING METHOD

(71) Applicant: SAMSUNG DISPLAY CO., LTD., Yongin-si (KR)

(72) Inventors: Yun-Ki Baek, Suwon-si (KR);
Nam-Gon Choi, Yongin-si (KR);
Hong-Soo Kim, Anyang-si (KR);
Yong-Jun Jang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 582 days.

(21) Appl. No.: 15/085,109

(22) Filed: Mar. 30, 2016

(65) Prior Publication Data

US 2017/0025056 A1    Jan. 26, 2017

(30) Foreign Application Priority Data

Jul. 23, 2015  (KR) ........................ 10-2015-0104498

(51) Int. Cl.
*G09G 3/3258*  (2016.01)
*G09G 3/20*    (2006.01)
(Continued)

(52) U.S. Cl.
CPC ......... *G09G 3/2074* (2013.01); *G09G 3/2003* (2013.01); *G09G 3/2018* (2013.01);
(Continued)

(58) Field of Classification Search
CPC ............ G09G 3/2018; G09G 2310/08; G09G 2320/041; G09G 2320/0666;
(Continued)

(56) References Cited

U.S. PATENT DOCUMENTS 6,160,579 A * 12/2000 Shiraiwa ............. H04N 1/4072
   348/224.1
6,201,893 B1 * 3/2001 Shiraiwa ............. H04N 1/4074
   348/E9.052
(Continued)

FOREIGN PATENT DOCUMENTS

KR  10-2004-0057147    7/2004
KR  10-2006-0017277    2/2006
(Continued)

OTHER PUBLICATIONS

Office Action dated Aug. 20, 2021 in corresponding Korean Patent Application No. 10-2015-0104498 (3 pages).
(Continued)

*Primary Examiner* — Temesghen Ghebretinsae
*Assistant Examiner* — Karin Kiyabu
(74) *Attorney, Agent, or Firm* — F. Chau & Associates, LLC

(57) ABSTRACT

A display device includes a display panel including a plurality of sub-pixels, a grayscale conversion part configured to generate a data signal displaying different grayscales to the sub-pixels at a predetermined time interval, and a data driver configured to convert the data signal into a data voltage and to output the data voltage to the display panel.

16 Claims, 11 Drawing Sheets

(51) Int. Cl.
*G09G 3/3275* (2016.01)
*G09G 3/36* (2006.01)
*G02F 1/1343* (2006.01)
*G02F 1/1333* (2006.01)

(52) U.S. Cl.
CPC ......... *G09G 3/3258* (2013.01); *G09G 3/3275* (2013.01); *G09G 3/3607* (2013.01); *G09G 3/3688* (2013.01); *G02F 1/133397* (2021.01); *G02F 1/134309* (2013.01); *G09G 2300/0426* (2013.01); *G09G 2300/0452* (2013.01); *G09G 2310/027* (2013.01); *G09G 2310/08* (2013.01); *G09G 2320/0257* (2013.01); *G09G 2320/041* (2013.01); *G09G 2320/0673* (2013.01)

(58) Field of Classification Search
CPC .. G09G 3/2074; G09G 3/2003; G09G 3/3275; G09G 3/3258; G09G 3/3688; G09G 2300/0426; G09G 2300/0452; G02F 1/133397; G02F 1/134309
See application file for complete search history.

(56) References Cited

U.S. PATENT DOCUMENTS

| | | | | |
|---|---|---|---|---|
| 6,809,714 B1* | 10/2004 | Yamauchi | .............. | H04N 9/735 345/591 |
| 6,862,012 B1* | 3/2005 | Funakoshi | ........... | G09G 3/2092 345/101 |
| 7,800,597 B2* | 9/2010 | Hong | .................. | G09G 3/3648 345/204 |
| 8,289,252 B2 | 10/2012 | Jo et al. | | |
| 8,587,580 B2* | 11/2013 | Kim | ..................... | G09G 3/3413 345/212 |
| 8,730,227 B2* | 5/2014 | Lee | ..................... | G09G 3/3696 345/204 |
| 8,842,103 B2* | 9/2014 | Woo | ..................... | G09G 3/3648 345/204 |
| 8,872,858 B2* | 10/2014 | Shin | ..................... | G09G 3/3648 345/690 |
| 8,902,142 B2 | 12/2014 | Yoon et al. | | |
| 9,837,045 B2* | 12/2017 | Furihata | ................. | G09G 3/36 |
| 2003/0020725 A1* | 1/2003 | Matsuda | ................. | H04N 5/58 345/600 |
| 2003/0095138 A1* | 5/2003 | Kim | ..................... | G06T 11/001 345/690 |
| 2003/0122761 A1* | 7/2003 | Hong | .................. | G09G 3/2011 345/89 |
| 2005/0276507 A1* | 12/2005 | White | ..................... | G06T 5/009 382/274 |
| 2006/0038837 A1* | 2/2006 | Hong | .................. | G09G 3/3648 345/691 |
| 2007/0013633 A1* | 1/2007 | Kamada | ................ | G02F 1/1362 345/98 |
| 2007/0070008 A1* | 3/2007 | Shin | ..................... | G09G 3/3648 345/89 |
| 2007/0132788 A1* | 6/2007 | Heo | ........................ | G09G 5/02 345/660 |
| 2008/0136761 A1* | 6/2008 | Hong | .................. | G09G 3/2022 345/89 |
| 2009/0262057 A1* | 10/2009 | Yoon | .................... | G09G 3/3406 345/89 |
| 2009/0262106 A1* | 10/2009 | Lu | ........................ | G02F 1/13624 345/214 |
| 2010/0039455 A1* | 2/2010 | Ahn | ..................... | G09G 3/3648 345/690 |
| 2011/0109733 A1* | 5/2011 | Kim | ................... | G02B 27/2264 348/56 |
| 2012/0007894 A1* | 1/2012 | Shin | ..................... | G09G 3/3648 345/690 |
| 2012/0056856 A1* | 3/2012 | Woo | ..................... | G09G 3/3648 345/204 |
| 2012/0176063 A1* | 7/2012 | Hatley | ................. | H05B 33/0863 315/297 |
| 2012/0182280 A1* | 7/2012 | Park | ..................... | G09G 3/3648 345/211 |
| 2015/0062197 A1* | 3/2015 | Jung | .................... | G09G 3/2003 345/690 |
| 2015/0070405 A1* | 3/2015 | Lee | ..................... | G09G 3/3696 345/690 |
| 2015/0109460 A1* | 4/2015 | Yonishi | ................. | H04N 17/02 348/182 |
| 2015/0317928 A1* | 11/2015 | Safaee-Rad | ......... | G09G 3/2003 345/593 |

FOREIGN PATENT DOCUMENTS

| | | |
|---|---|---|
| KR | 10-2007-0065693 | 6/2007 |
| KR | 1020070062052 | 6/2007 |
| KR | 1020080063435 | 7/2008 |
| KR | 10-2009-0110070 | 10/2009 |
| KR | 1020110008500 | 1/2011 |
| KR | 1020150027954 | 3/2015 |
| KR | 1020150029895 | 3/2015 |

OTHER PUBLICATIONS

Notice of Allowance dated Feb. 9, 2022 in corresponding Korean Patent Application No. 10-2015-0104498, in Korean (5 pages).

* cited by examiner

DISPLAY APPARATUS AND DRIVING METHOD

CROSS-REFERENCE TO RELATED APPLICATIONS

This application claims priority under 35 U.S.C. § 119 to Korean Patent Application No. 10-2015-0104498, filed on Jul. 23, 2015 in the Korean Intellectual Property Office (KIPO), the contents of which are herein incorporated by reference in their entireties.

FIELD

Exemplary embodiments of the present inventive concept relates to a display device and method of driving the display device. More particularly, the present inventive concept relates to a display device improving a display quality and a method of driving the display device.

DISCUSSION OF RELATED ART

A display device, such as a liquid crystal display ("LCD") and/or an organic light emitting diode ("OLED") display, generally includes a display panel including a plurality of pixels including a switching element and a plurality of signal lines, a gray voltage generator that generates a gray reference voltage, and a data driver that generates a plurality of gray voltages using the gray reference voltage and applies the gray voltage corresponding to an input image signal among the generated gray voltages as a data signal to a data line.

The LCD typically includes two display panel portions having pixel electrodes and an opposing electrode, respectively, and a liquid crystal layer having dielectric anisotropy interposed therebetween. The pixel electrodes are arranged in a matrix form and each connected to a switching element such as a thin film transistor ("TFT") to sequentially receive the data voltage row by row. The opposing electrode is disposed through substantially the entire surface of the display panel and receives a common voltage. The pixel electrodes and the opposing electrode have voltages applied to generate an electric field in the liquid crystal layer such that the intensity of the electric field is controlled and transmittance of light passing through the liquid crystal layer is controlled, thereby obtaining a desired image.

In order to obtain a desired image, a voltage is applied to a pixel electrode of the LCD. However, when the same voltage is applied to a pixel electrode consistently, the liquid crystal therebetween may become hard. Thus, an afterimage may occur.

SUMMARY

Exemplary embodiments of the present inventive concept provide a display apparatus capable of high display quality on a display panel.

Exemplary embodiments of the present inventive concept also provide a method of driving the display panel using the display apparatus.

In an exemplary embodiment of a display device according to the present inventive concept, the display device includes a display panel including a plurality of sub-pixels that is configured to display an image, a grayscale conversion part configured to generate a data signal displaying different grayscales to the sub-pixels at a predetermined time interval, and a data driver configured to convert the data signal into a data voltage and to output the data voltage to the display panel.

In an exemplary embodiment, the grayscale conversion part may include a white point adjuster configured to generate white point conversion data for converting a white point at a predetermined time interval based on input image data, and a gamma mixer configured to generate gamma mix data mixing a gamma based on the input image data, the white point conversion data and gamma data input from outside.

In an exemplary embodiment, the white point adjuster may include a color temperature selector configured to generate coordinate data concerning a white point being adjusted and a calculator configured to calculate white point adjusting data by using the coordinate data and the input image data.

In an exemplary embodiment, the gamma mixer may include a selector configured to generate selecting data based on the input image data and white point adjusting data and a temporal gamma part configured to generate gamma mix data mixing a gamma based on the selecting data and gamma data input from outside.

In an exemplary embodiment, the gamma mixer may further include a timer configured to generate an enable signal making the selector select a signal comprising an adjusted white point at a predetermined time interval.

In an exemplary embodiment, the grayscale conversion part may include a white point adjuster configured to generate white point conversion data converting a white point at a predetermined time interval based on input image data.

In an exemplary embodiment, the white point adjuster may include a color temperature selector configured to generate coordinate data concerning a white point being adjusted, a calculator configured to calculate white point adjusting data by using the coordinate data and the input image data and a selector configured to generate selecting data based on the input image data and white point adjusting data.

In an exemplary embodiment, the white point adjuster may further include a timer configured to generate an enable signal making the selector select a signal comprising an adjusted white point at a predetermined time interval.

In an exemplary embodiment, the grayscale conversion part may include a gamma mixer configured to generate gamma mix data mixing gamma based on the input image data and gamma data input from outside.

In an exemplary embodiment, the gamma mixer may include a temporal gamma part configured to generate gamma mix data mixing a gamma based on the input image data and gamma data input from outside.

In an exemplary embodiment of a method of driving a display panel according to the present inventive concept, the method includes inputting an input image data, generating a data signal displaying different grayscales to sub-pixels at a predetermined time interval and outputting the data signal to the display panel.

In an exemplary embodiment, generating the data signal may include generating white point conversion data converting a white point at a predetermined time interval based on input image data and generating gamma mix data mixing gamma based on the input image data, the white point conversion data and gamma data input from outside.

In an exemplary embodiment, generating the white point conversion data may include generating coordinate data concerning a white point being adjusted and calculating white point adjusting data by using the coordinate data and the input image data.

In an exemplary embodiment, generating the gamma mix data may include generating selecting data based on the input image data and white point adjusting data and generating gamma mix data mixing a gamma based on the selecting data and gamma data input from outside.

In an exemplary embodiment, generating the selecting data may further include generating an enable signal making the selector select a signal comprising an adjusted white point at a predetermined time interval.

In an exemplary embodiment, generating the data signal may include generating white point conversion data converting a white point at a predetermined time interval based on input image data.

In an exemplary embodiment, generating white point conversion data may include generating coordinate data concerning a white point being adjusted, calculating white point adjusting data by using the coordinate data and the input image data and generating selecting data based on the input image data and white point adjusting data.

In an exemplary embodiment, generating selecting data may further include generating an enable signal making the selector select a signal comprising an adjusted white point at a predetermined time interval.

In an exemplary embodiment, generating the data signal may include generating gamma mix data mixing a gamma based on the input image data and gamma data input from outside.

In an exemplary embodiment, generating the gamma mix data may include generating gamma mix data mixing gamma based on the input image data and gamma data input from outside.

In an exemplary embodiment, a display driver includes a timing controller, a data driver connected to the timing controller, and a white point adjuster or a gamma mixer connected between the timing controller and the data driver, where the white point adjuster or the gamma mixer includes a timer and a selector, the timer configured to emit a signal to the selector at a predetermined interval, and the selector configured to alternate upon receipt of the emitted signal between data based on a first color temperature and otherwise equivalent data based on at least a second color temperature.

In an exemplary embodiment, the gamma mixer includes multiple gamma tables connected to a temporal gamma unit for converting the data from the first color temperature to at least the second color temperature.

In an exemplary embodiment, the white point adjuster includes a color temperature selector and a calculator connected to the color temperature selector.

In an exemplary embodiment, the calculator includes a memory configured to store coordinate data received from the color temperature selector, multipliers configured to multiply the stored coordinate data by original color component image data, and adders configured to add the multiplied results for each of the original color components to form adjusted color component image data.

In an exemplary embodiment, the predetermined interval is less than about one one-hundredth of a second, and the perceptive resolution of an observer is greater than about one one-hundredth of a second.

In an exemplary embodiment, the predetermined interval is about 1/120th of a second, and the perceptive resolution of an observer is about 1/60th of a second.

According to the an exemplary embodiment, a white point may be converted at a predetermined time interval and an image based on a high gamma and an image based on a low gamma may be displayed being temporally divided. Therefore, a voltage applied to a pixel electrode is converted at a predetermined time interval and a liquid crystal may be substantially prevented from becoming hard. Thus, any afterimage may be substantially minimized.

BRIEF DESCRIPTION OF THE DRAWINGS

The above and other features of the present inventive concept will become more apparent by describing in detailed exemplary embodiments thereof with reference to the accompanying drawings, in which.

DETAILED DESCRIPTION

Hereinafter, the present invention will be explained in detail with reference to the accompanying drawings.

Figure 1:
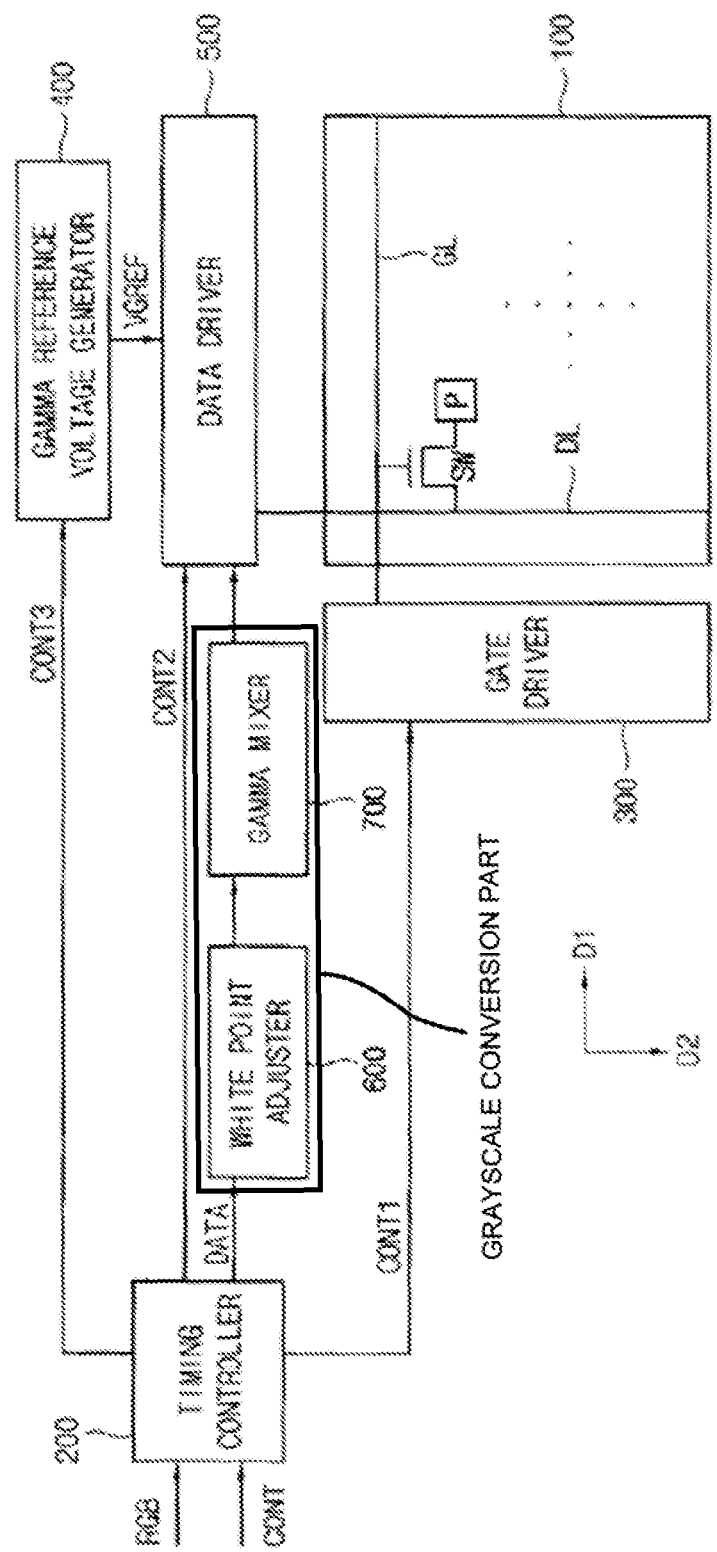
FIG. 1 is a schematic block diagram illustrating a display apparatus according to an exemplary embodiment of the present inventive concept.

FIG. 1 is a block diagram illustrating a display apparatus according to an exemplary embodiment of the present inventive concept.

Referring to FIG. 1, the display apparatus includes a display panel 100 connected to a display panel driver. The display panel driver includes a timing controller 200, a gate driver 300 connected to the timing controller, a gamma reference voltage generator 400 connected to the timing controller, a data driver 500 connected to the timing controller and the gamma reference voltage generator, a white point adjuster 600 connected to the timing controller and a gamma mixer 700 connected between the timing controller and the data driver.

The display panel 100 displays an image based on input image data. The display panel 100 may have a display region on which the image is displayed and a peripheral region adjacent to the display region.

The display panel 100 includes a plurality of gate lines GL, a plurality of data lines DL and a plurality of sub-pixels P connected to the gate lines GL and the data lines DL. The gate lines GL may extend in a first direction D1 and the data lines DL may extend in a second direction D2 crossing the first direction D1.

Each sub-pixel P may include a switching element SW and a capacitor electrically connected to the switching element SW. The sub-pixels P may be disposed in a matrix form. The switching element SW may be a thin film transistor.

For example, the display apparatus may be a liquid crystal display apparatus. For example, the display apparatus may be an organic light emitting diode display apparatus. The present inventive concept may be applied to various display apparatuses which include the thin film transistor.

The timing controller 200 receives the input image data RGB and an input control signal CONT from an external apparatus (not shown). The input image data may include red image data R, green image data G and blue image data B. The input control signal CONT may include a master clock signal and a data enable signal. The input control signal CONT may further include a vertical synchronization signal and a horizontal synchronization signal.

The timing controller 200 generates a first control signal CONT1, a second control signal CONT2, a third control signal CONT3 and a data signal DATA based on the input image data RGB and the input control signal CONT.

The timing controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The timing controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The timing controller 200 generates a data signal DATA based on the input image data RGB. The timing controller 200 outputs the data signal DATA to the data driver 500.

The data signal DATA is output to the data driver 500 through the white point adjuster 600 and the gamma mixer 700.

The white point adjuster 600 generates white point conversion data converting a white point at a predetermined time interval. The white point adjuster 600 may include a color temperature selector and a calculator.

The white point conversion data generated by the white point adjuster 600 is output to the gamma mixer 700.

The gamma mixer 700 generates a gamma mix data mixing a gamma temporally. The gamma mixer 700 may include a selector and a temporal gamma part.

The gamma mix data generated by the gamma mixer 700 is output to the data driver 500.

In the present exemplary embodiment, the display apparatus includes a grayscale conversion part including the white point adjuster 600 and the gamma mixer 700. The grayscale conversion part generates a signal displaying a different grayscale to the sub-pixels at a predetermined time interval. Thus, a voltage applied to a pixel electrode is converted at a predetermined time interval and a liquid crystal might not become hard. Thus, any afterimage may be substantially minimized.

The timing controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the timing controller 200. The gate driver 300 sequentially outputs the gate signals to the gate lines GL.

The gate driver 300 may be integrated with the peripheral portion of the display panel 100. Alternatively, the gate driver 300 may be directly mounted on the display panel 100, or may be connected to the display panel 100 as a tape carrier package (TCP) type.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level of the data signal DATA.

In an exemplary embodiment, the gamma reference voltage generator 400 may be disposed in the timing controller 200, or in the data driver 500.

The data driver 500 receives the second control signal CONT2 and the data signal DATA from the timing controller 200, and receives the gamma reference voltages VGREF from the gamma reference voltage generator 400. The data driver 500 converts the data signal DATA, as adjusted by the white point adjuster and/or mixed by the gamma mixer, into data voltages having an analog type using the gamma reference voltages VGREF. The data driver 500 outputs the data voltages to the data lines DL.

The data driver 500 may be directly mounted on the display panel 100, or be connected to the display panel 100 in a TCP type. Alternatively, the data driver 500 may be integrated on the display panel 100.

Figure 2:
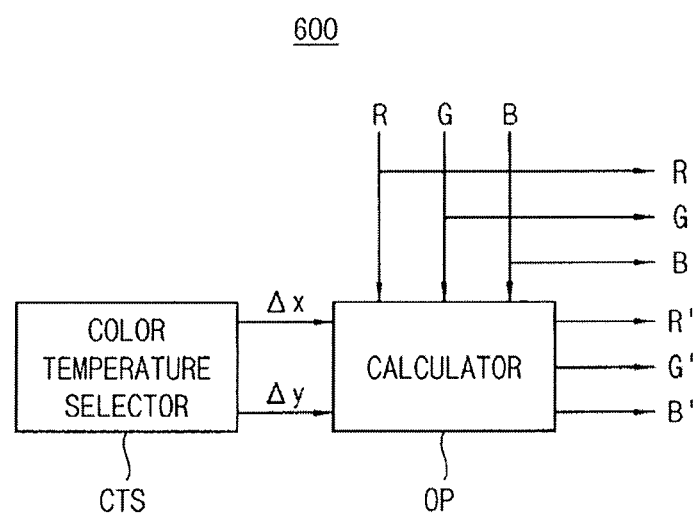
FIG. 2 is schematic block diagram illustrating an exemplary white point adjuster of FIG. 1.

FIG. 2 is block diagram illustrating an exemplary white point adjuster of FIG. 1.

Referring to FIG. 2, a white point adjuster 600 of the display apparatus according to an exemplary embodiment of the present inventive concept includes a color temperature selector CTS connected to a calculator OP.

The color temperature selector CTS generates a coordinate data $\Delta x$ $\Delta y$ concerning a white point being adjusted. The coordinate data $\Delta x$ $\Delta y$ generated by the color temperature selector CTS is input to the calculator OP. The color temperature selector CTS may generate coordinate data $\Delta x$ $\Delta y$ concerning white points having different color temperature in order to convert a white point at a predetermined time interval.

The calculator OP calculates white point adjusting data R', G', B' by using the coordinate data $\Delta x$ $\Delta y$ and the input image data RGB. The calculator OP converts the input image data RGB by using the coordinate data $\Delta x$ $\Delta y$, and then the calculator OP calculates the white point adjusting data R', G', B' of a target color temperature. The white point adjusting data R', G', B' and the input image data RGB is input to the gamma mixer 700. The calculator OP is explained referring to FIG. 3 in detail.

Figure 3:
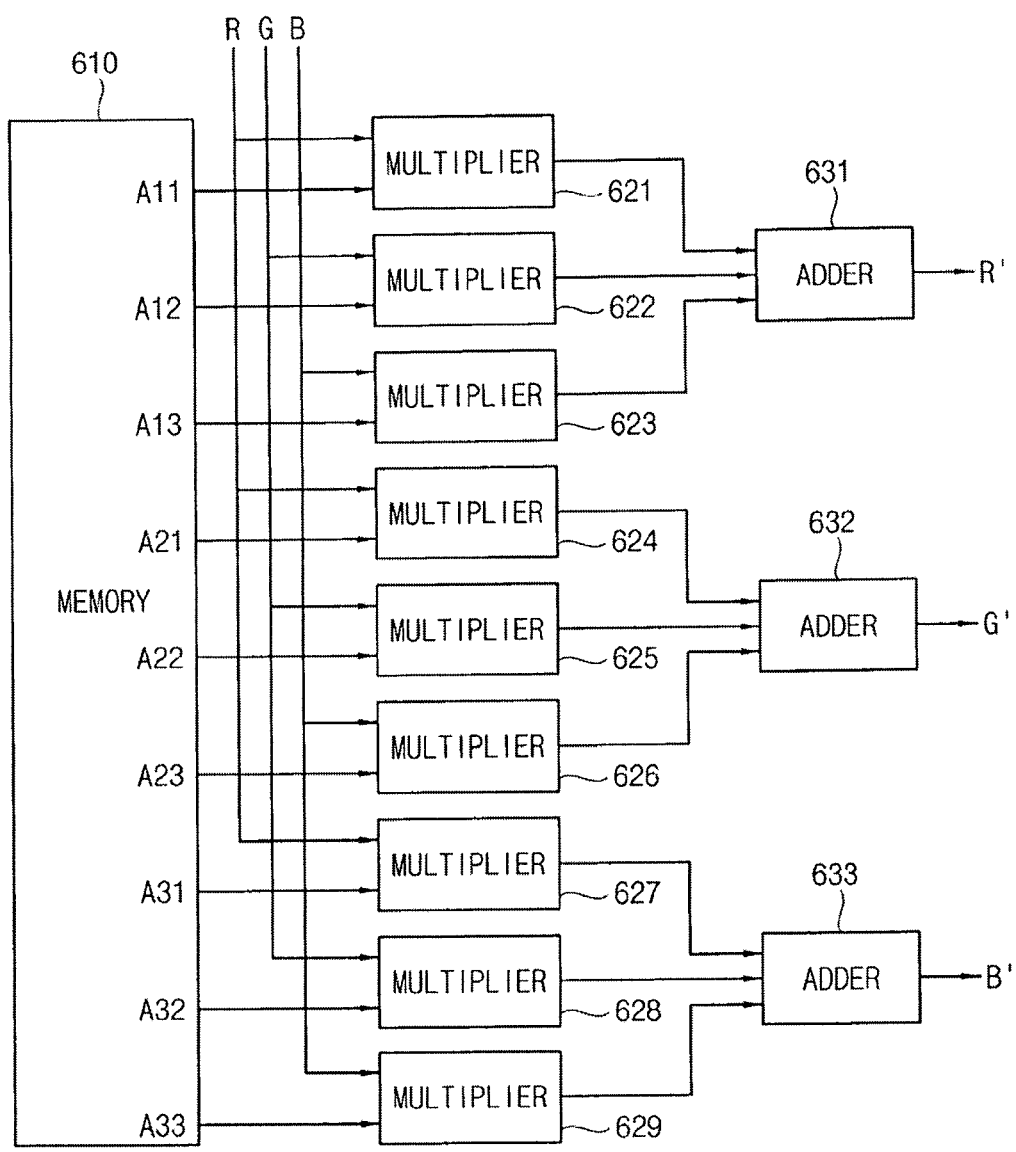
FIG. 3 is schematic block diagram illustrating an exemplary calculator of FIG. 2.

FIG. 3 is block diagram illustrating an exemplary calculator of FIG. 2.

Referring to FIG. 3, a calculator OP of the display apparatus according to an exemplary embodiment of the present inventive concept includes a memory 610 connected to multipliers 621, 622, 623, 624, 625, 626, 627, 628 and 629, which, in turn, are connected to adders 631, 621 and 633.

The coordinate data Δx Δy generated from the color temperature selector CTS is stored in the memory 610. The coordinate data Δx Δy stored in the memory 610 is input to the multipliers 621, 622, 623, 624, 625, 626, 627, 628 and 629.

The input image data RGB and the coordinate data Δx Δy are input to the multipliers 621, 622, 623, 624, 625, 626, 627, 628 and 629. Thus, the multipliers 621, 622, 623, 624, 625, 626, 627, 628 and 629 output results of the coordinate data Δx Δy multiplied by the input image data RGB to the adders 631, 632 and 633.

The adders 631, 632 and 633 add values output from the multipliers 621, 622, 623, 624, 625, 626, 627, 628 and 629 to calculate the white point adjusting data R', G', B'.

That is, the coordinate data Δx Δy generated from the color temperature selector CTS is stored in the memory 610. The coordinate data Δx Δy stored in the memory 610 is input to the multipliers 621, 622, 623, 624, 625, 626, 627, 628 and 629.

For example, input image data R and coordinate data A11 are input to a first multiplier 621, and input image data G and coordinate data A12 are input to a second multiplier 622, and input image data B and coordinate data A13 are input to a third multiplier 623.

The first multiplier 621 outputs results of the coordinate data A11 multiplied by the input image data R to a first adder 631, and the second multiplier 622 outputs results of the coordinate data A12 multiplied by the input image data G to the first adder 631, and third multiplier 623 outputs results of the coordinate data A13 multiplied by the input image data B to the first adder 631.

The first adder 631 outputs a white point adjusting data R'. The white point adjusting data R' is calculated by adding a value of the coordinate data A11 multiplied by the input image data R, a value of the coordinate data A12 multiplied by the input image data G, and a value of the coordinate data A13 multiplied by the input image data B. The white point adjusting data R' may be input to the gamma mixer 700.

In addition, input image data R and coordinate data A21 are input to a fourth multiplier 624, input image data G and coordinate data A22 are input to a fifth multiplier 625, and input image data B and coordinate data A23 are input to a sixth multiplier 626.

The fourth multiplier 624 outputs results of the coordinate data A21 multiplied by the input image data R to a second adder 632, the fifth multiplier 625 outputs results of the coordinate data A22 multiplied by the input image data G to the second adder 632, and sixth multiplier 626 outputs results of the coordinate data A23 multiplied by the input image data B to the second adder 632.

The second adder 632 outputs a white point adjusting data G'. The white point adjusting data G' is calculated by adding a value of the coordinate data A21 multiplied by the input image data R, a value of the coordinate data A22 multiplied by the input image data G, and a value of the coordinate data A23 multiplied by the input image data B. The white point adjusting data G' may be input to the gamma mixer 700.

In addition, input image data R and coordinate data A31 are input to a seventh multiplier 627, input image data G and coordinate data A32 are input to an eighth multiplier 628, and input image data B and coordinate data A33 are input to a ninth multiplier 629.

The seventh multiplier 627 outputs results of the coordinate data A31 multiplied by the input image data R to a third adder 633, the eighth multiplier 628 outputs results of the coordinate data A32 multiplied by the input image data G to the third adder 633, and the ninth multiplier 629 outputs results of the coordinate data A33 multiplied by the input image data B to the third adder 633.

The third adder 633 outputs a white point adjusting data B'. The white point adjusting data B' is calculated by adding a value of the coordinate data A31 multiplied by the input image data R, a value of the coordinate data A32 multiplied by the input image data G, and a value of the coordinate data A33 multiplied by the input image data B. The white point adjusting data B' may be input to the gamma mixer 700.

Figure 4:
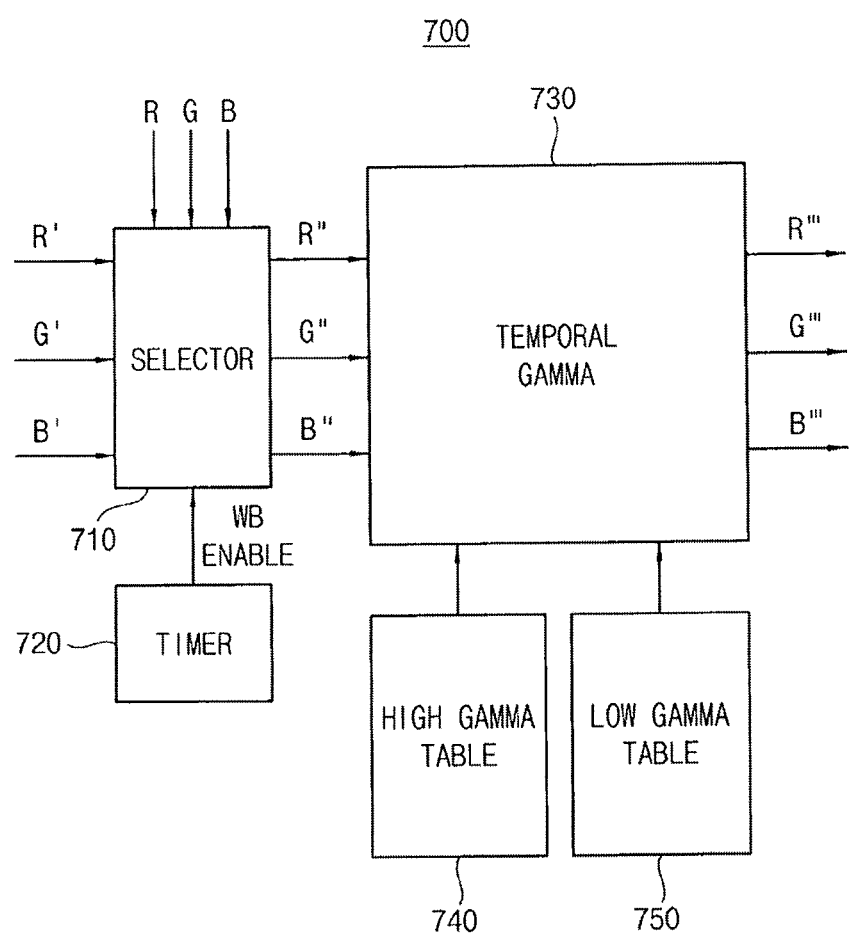
FIG. 4 is schematic block diagram illustrating an exemplary gamma mixer of FIG. 1.

FIG. 4 is block diagram illustrating an exemplary gamma mixer of FIG. 1.

Referring to FIG. 4, a gamma mixer 700 of the display apparatus according to an exemplary embodiment of the present inventive concept includes a selector 710, a timer 720 connected to the selector, a temporal gamma part 730 connected to the selector, a high gamma table 740 connected to the temporal gamma part and a low gamma table 750 connected to the temporal gamma part.

The selector 710 generates selecting data R", G", B" based on the input image data R, G, B and white point adjusting data R', G', B'. The selecting data R", G", B" may be determined as selected values between the input image data R, G, B and white point adjusting data R', G', B'. In addition, the selector 710 may control frequency of the input image data R, G, B and white point adjusting data R', G', B'.

The timer 720 generates an enable signal making the selector select a signal comprising an adjusted white point at a predetermined time interval. The timer 720 provides the enable signal to the selector 710. Thus, the selector 710 may generate the selecting data R", G", B" at a predetermined time interval.

The selecting data R", G", B" generated from the selector 710 is input to the temporal gamma part 730.

Data stored in the high gamma table 740 and the low gamma table 750 and the selecting data R", G", B" generated from the selector 710 are input to the temporal gamma part 730. Thus, the selecting data R", G", B" is input to the temporal gamma part 730, and then the temporal gamma part 730 generates gamma mix data R'", G'", B'" by using data stored in the high gamma table 740 and the low gamma table 750.

In the present exemplary embodiment, the gamma mixer 700 includes the high gamma table 740 and the low gamma table 750. However, the present inventive concept is not limited thereto. Alternatively, the gamma mixer 700 may include more than two gamma tables.

The gamma mix data R'", G'", B'" generated from the temporal gamma part 730 is output to the data driver 500. Thus, an image based on a high gamma and an image based on a low gamma may be displayed being temporally divided. Therefore, a voltage applied to a pixel electrode is converted at a predetermined time interval and the liquid crystal material may be substantially prevented from becoming hard. Thus, an afterimage may be substantially minimized.

Figure 5:
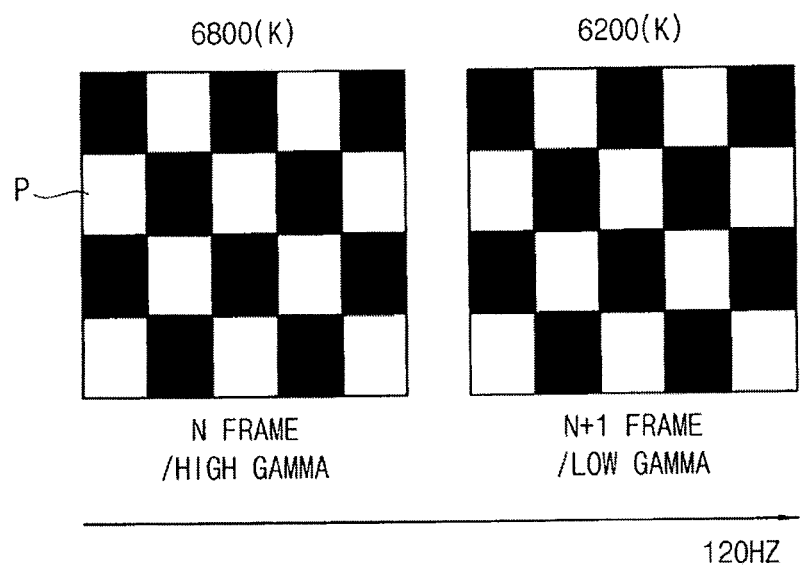
FIG. 5 is a partial schematic diagram illustrating an image displayed to sub-pixels by a method of driving the display panel according to an exemplary embodiment of the inventive concept.
Figure 6:
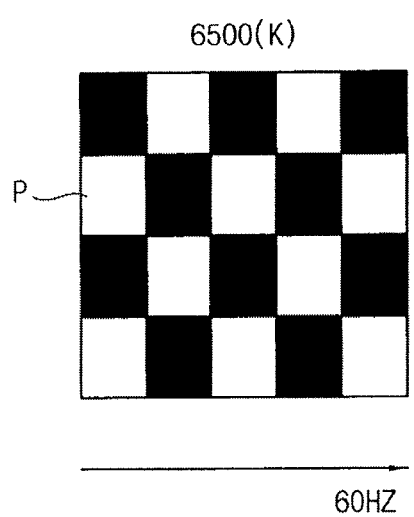
FIG. 6 is a partial schematic diagram illustrating a state in which a user perceives the image of FIG. 5.

FIG. 5 is a diagram illustrating an image displayed to sub-pixels by a method of driving the display panel according to an exemplary embodiment of the inventive concept. FIG. 6 is a diagram illustrating a state in which a user perceives the image of FIG. 5.

Referring to FIGS. 5 and 6, an image displayed to sub-pixels by a method of driving the display panel according to an exemplary embodiment of the inventive concept is illustrated.

An image based on a high gamma having a color temperature of 6800K is displayed in a N-th frame, and an image based on a low gamma having a color temperature of 6200K is displayed in a (N+1)-th frame. That is, an image based on a high gamma and an image based on a low gamma may be alternately displayed being temporally divided.

Different voltages are applied to sub-pixels in the N-th frame and (N+1)-th frame respectively. However, a user perceives an image as an average of luminance of the image based on a high gamma and luminance of the image based on a low gamma. Thus, distortion of an image may be substantially prevented. That is, since the image based on a high gamma having a color temperature of 6800K is displayed in a N-th frame and the image based on a low gamma having a color temperature of 6200K is displayed in a (N+1)-th frame, the user perceives an image as an image having a color temperature of (6800K+6200K)/2=6500K.

Figure 7:
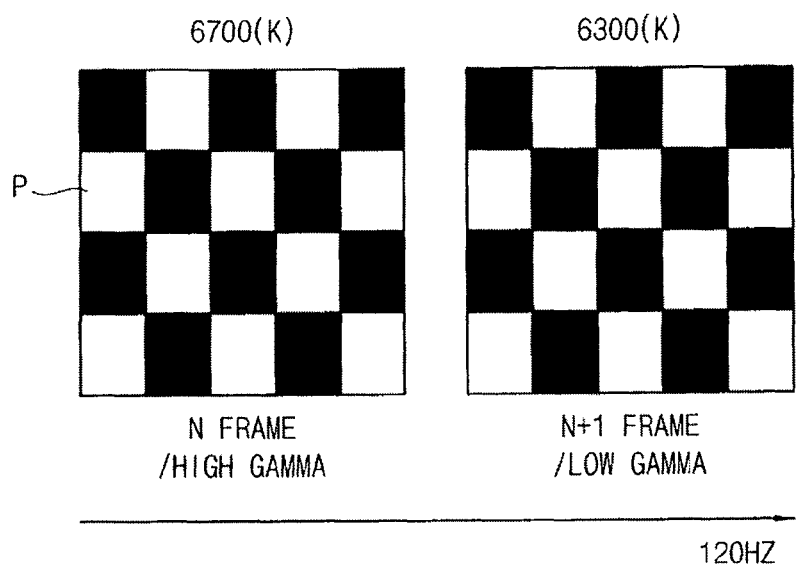
FIG. 7 is a partial schematic diagram illustrating an image displayed to sub-pixels by a method of driving the display panel according to an exemplary embodiment of the inventive concept.
Figure 8:
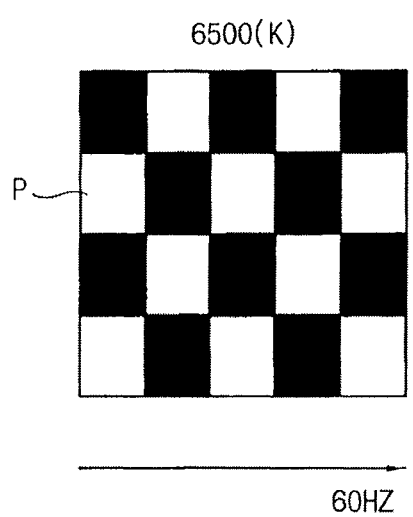
FIG. 8 is a partial schematic diagram illustrating a state in which a user perceives the image of FIG. 7.

FIG. 7 is a diagram illustrating an image displayed to sub-pixels by a method of driving the display panel according to an exemplary embodiment of the inventive concept. FIG. 8 is a conceptual diagram illustrating a state in which a user perceives the image of FIG. 7.

Referring to FIGS. 7 and 8, an image displayed to sub-pixels by a method of driving the display panel according to an exemplary embodiment of the inventive concept is illustrated.

An image based on a high gamma having a color temperature of 6700K is displayed in a N-th frame, and an image based on a low gamma having a color temperature of 6300K is displayed in a (N+1)-th frame. That is, an image based on a high gamma and an image based on a low gamma may be alternately displayed being temporally divided.

Different voltages are applied to sub-pixels in the N-th frame and (N+1)-th frame respectively. However, a user perceives an image as an average of luminance of the image based on a high gamma and luminance of the image based on a low gamma. Thus, distortion of an image may be substantially prevented. That is, since the image based on a high gamma having a color temperature of 6700K is displayed in a N-th frame and the image based on a low gamma having a color temperature of 6300K is displayed in a (N+1)-th frame, the user perceives an image as an image having a color temperature of (6700K+6300K)/2=6500K.

According to the present exemplary embodiment, a white point may be converted at a predetermined time interval and an image based on a high gamma and an image based on a low gamma may be alternately displayed being temporally divided. Therefore, a voltage applied to a pixel electrode is converted at a predetermined time interval, so that a liquid crystal may be substantially prevented from hardening. Thus, an afterimage may be substantially minimized.

In an embodiment, the predetermined interval is less than about one one-hundredth of a second, and the perceptive resolution of an observer is greater than about one one-hundredth of a second. For example, the predetermined interval is $1/120^{th}$ of a second in FIGS. 5 and 7, and the perceptive resolution of an observer is about $1/60^{th}$ of a second in FIGS. 6 and 8.

Figure 9:
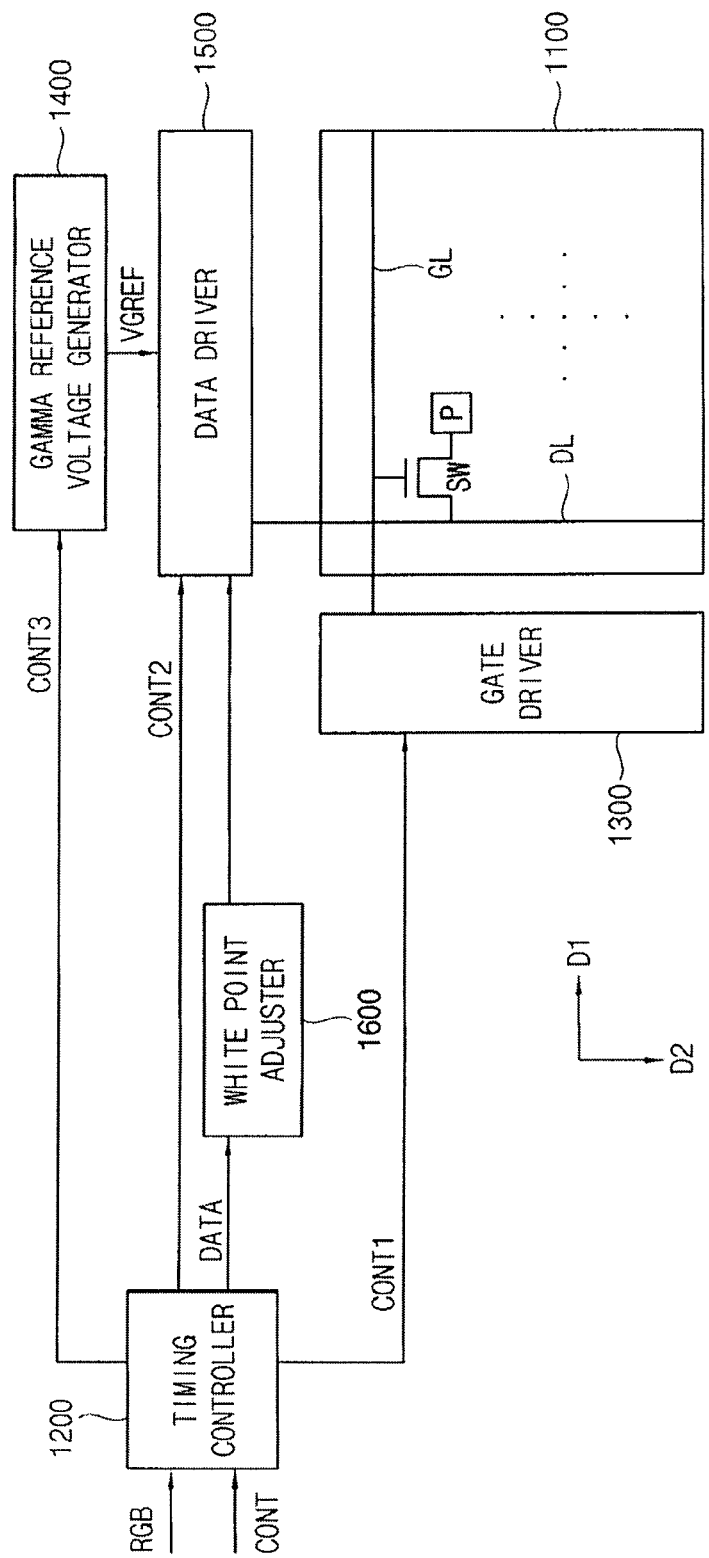
FIG. 9 is a schematic block diagram illustrating a display apparatus according to an exemplary embodiment of the present inventive concept.

FIG. 9 is a block diagram illustrating a display apparatus according to an exemplary embodiment of the present inventive concept.

Referring to FIG. 9, the display apparatus includes a display panel 1100 connected to a display panel driver. The display panel driver includes a timing controller 1200, a gate driver 1300 connected to the timing controller, a gamma reference voltage generator 1400 connected to the timing controller, a data driver 1500 connected to the timing controller and to the gamma reference voltage generator, and a white point adjuster 1600 connected between the timing controller and the data driver.

The display panel 1100 displays an image based on input image data. The display panel 1100 may have a display region on which the image is displayed and a peripheral region adjacent to the display region.

The display panel 1100 includes a plurality of gate lines GL, a plurality of data lines DL and a plurality of sub-pixels P connected to the gate lines GL and the data lines DL. The gate lines GL may extend in a first direction D1 and the data lines DL may extend in a second direction D2 crossing the first direction D1.

Each sub-pixel P may include a switching element SW and a capacitor electrically connected to the switching element SW. The sub-pixels P may be disposed in a matrix form. For example, the switching element SW may be a thin film transistor.

The display apparatus may be a liquid crystal display apparatus and/or an organic light emitting diode display apparatus, for example. The present inventive concept may be applied to various display apparatuses including those with thin film transistors, but not limited thereto.

The timing controller 1200 receives the input image data RGB and an input control signal CONT from an external apparatus (not shown). The input image data may include red image data R, green image data G and blue image data B. The input control signal CONT may include a master clock signal and a data enable signal. The input control signal CONT may further include a vertical synchronization signal and a horizontal synchronization signal.

The timing controller 1200 generates a first control signal CONT1, a second control signal CONT2, a third control signal CONT3 and a data signal DATA based on the input image data RGB and the input control signal CONT.

The timing controller 1200 generates the first control signal CONT1 for controlling an operation of the gate driver 1300 based on the input control signal CONT, and outputs the first control signal CONT1 to the gate driver 1300. The first control signal CONT1 may include a vertical start signal and a gate clock signal.

The timing controller 1200 generates the second control signal CONT2 for controlling an operation of the data driver 1500 based on the input control signal CONT, and outputs the second control signal CONT2 to the data driver 1500. The second control signal CONT2 may include a horizontal start signal and a load signal.

The timing controller 1200 generates a data signal DATA based on the input image data RGB. The timing controller 1200 outputs the data signal DATA to the data driver 1500.

The data signal DATA is output to the data driver 1500 through the white point adjuster 1600.

The white point adjuster 1600 generates white point conversion data converting a white point at a predetermined time interval. The white point adjuster 1600 may include a color temperature selector, a calculator, a timer and a selector.

The white point conversion data generated by the white point adjuster 1600 is output to data driver 1500.

In the present exemplary embodiment, the display apparatus includes a grayscale conversion part including the white point adjuster 1600. The grayscale conversion part generates a signal displaying different grayscales to the sub-pixels at a predetermined time interval. Thus, a voltage applied to a pixel electrode is converted at a predetermined time interval and a liquid crystal portion may be substantially prevented from hardening. Thus, an afterimage may be substantially minimized.

The timing controller 1200 generates the third control signal CONT3 for controlling an operation of the gamma reference voltage generator 1400 based on the input control signal CONT, and outputs the third control signal CONT3 to the gamma reference voltage generator 1400.

The gate driver 1300 generates gate signals driving the gate lines GL in response to the first control signal CONT1 received from the timing controller 1200. The gate driver 1300 sequentially outputs the gate signals to the gate lines GL.

The gate driver 1300 may be integrated on the peripheral portion of the display panel 1100. Alternatively, the gate driver 300 may be directly mounted on the display panel 1100, or may be connected to the display panel 1100 as a tape carrier package (TCP) type.

The gamma reference voltage generator 1400 generates a gamma reference voltage VGREF in response to the third control signal CONT3 received from the timing controller 1200. The gamma reference voltage generator 1400 provides the gamma reference voltage VGREF to the data driver 1500. The gamma reference voltage VGREF has a value corresponding to a level of the data signal DATA.

In an exemplary embodiment, the gamma reference voltage generator 1400 may be disposed in the timing controller 1200, or in the data driver 1500.

The data driver 1500 receives the second control signal CONT2 and the data signal DATA as adjusted by the white point adjuster from the timing controller 1200, and receives the gamma reference voltages VGREF from the gamma reference voltage generator 1400. The data driver 1500 converts the data signal DATA into data voltages having an analog type using the gamma reference voltages VGREF. The data driver 1500 outputs the data voltages to the data lines DL.

The data driver 1500 may be directly mounted on the display panel 1100, or be connected to the display panel 1100 in a TCP type. Alternatively, the data driver 1500 may be integrated with the display panel 1100.

Figure 10:
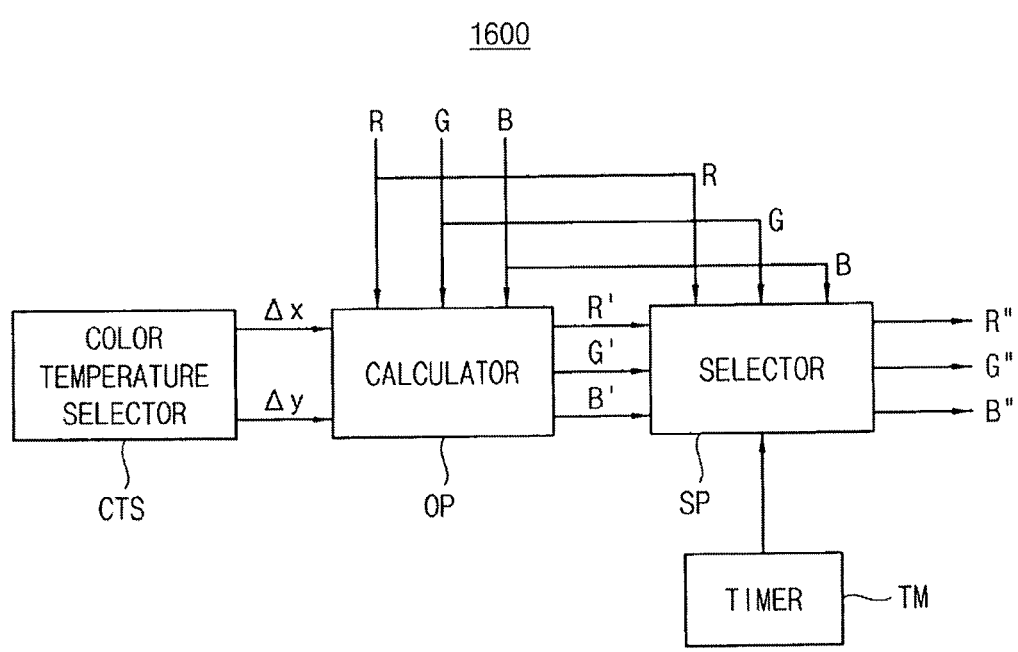
FIG. 10 is schematic block diagram illustrating an exemplary white point adjuster of FIG. 9.

FIG. 10 is block diagram illustrating an exemplary white point adjuster of FIG. 9.

Referring to FIG. 10, a white point adjuster 1600 of the display apparatus according to an exemplary embodiment of the present inventive concept includes a color temperature selector CTS, a calculator OP connected to the color temperature selector, a selector SP connected to the calculator and a timer TM connected to the selector.

The color temperature selector CTS generates coordinate data Δx Δy concerning a white point being adjusted. The coordinate data Δx Δy generated by the color temperature selector CTS is input to the calculator OP. The color temperature selector CTS may generate a coordinate data Δx Δy concerning white points having different color temperatures in order to convert a white point at a predetermined time interval.

The calculator OP calculates white point adjusting data R', G', B' by using the coordinate data Δx Δy and the input image data RGB. The calculator OP converts the input image data RGB by using the coordinate data Δx Δy, and then the calculator OP calculates the white point adjusting data R', G', B' of a target color temperature. The white point adjusting data R', G', B' and the input image data RGB is input to the selector SP.

The selector SP generates a selecting data R", G", B" based on the input image data R, G, B and white point adjusting data R', G', B'. The selecting data R", G", B" may be determined as selected values between the input image data R, G, B and white point adjusting data R', G', B'. In addition, the selector SP may control frequency of the input image data R, G, B and white point adjusting data R', G', B'.

The timer TM generates an enable signal making the selector select a signal comprising an adjusted white point at a predetermined time interval. The timer TM provides the enable signal to the selector SP. Thus, the selector SP may generate the selecting data R", G", B" at a predetermined time interval.

The selecting data R", G", B" generated from the selector SP is input to the data driver 1500.

Figure 11:
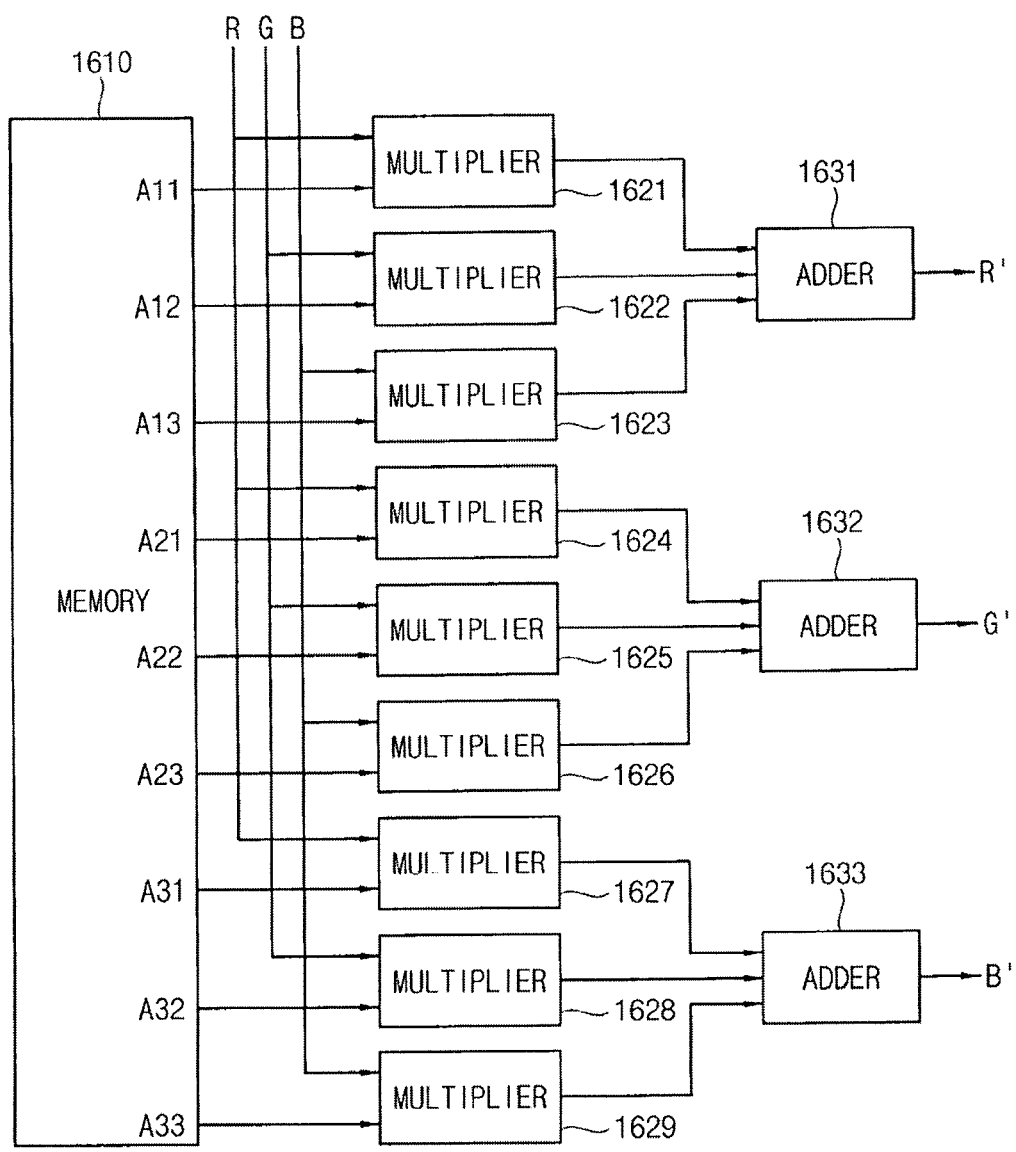
FIG. 11 is schematic block diagram illustrating an exemplary calculator of FIG. 10.

FIG. 11 is block diagram illustrating an exemplary calculator of FIG. 10.

Referring to FIG. 11, a calculator OP of the display apparatus according to an exemplary embodiment of the present inventive concept includes a memory 1610, multipliers 1621, 1622, 1623, 1624, 1625, 1626, 1627, 1628 and 1629 connected to the memory and adders 1631, 1632 and 1633 connected to the multipliers.

The coordinate data Δx Δy generated from the color temperature selector CTS is stored in the memory 1610. The coordinate data Δx Δy stored in the memory 1610 is input to the multipliers 1621, 1622, 1623, 1624, 1625, 1626, 1627, 1628 and 1629.

The input image data RGB and the coordinate data Δx Δy are input to the multipliers 1621, 1622, 1623, 1624, 1625, 1626, 1627, 1628 and 1629. Thus, the multipliers 1621, 1622, 1623, 1624, 1625, 1626, 1627, 1628 and 1629 output results of the coordinate data Δx Δy multiplied by the input image data RGB to the adders 1631, 1632 and 1633.

The adders 1631, 1632 and 1633 add values output from the multipliers 1621, 1622, 1623, 1624, 1625, 1626, 1627, 1628 and 1629 to calculate the white point adjusting data R', G', B'.

That is, the coordinate data Δx Δy generated from the color temperature selector CTS is stored in the memory 1610. The coordinate data Δx Δy stored in the memory 1610 is input to the multipliers 1621, 1622, 1623, 1624, 1625, 1626, 1627, 1628 and 1629.

For example, input image data R and coordinate data A11 are input to a first multiplier 1621, input image data G and coordinate data A12 are input to a second multiplier 1622, and input image data B and coordinate data A13 are input to a third multiplier 1623.

The first multiplier 1621 outputs results of the coordinate data A11 multiplied by the input image data R to a first adder 1631, the second multiplier 1622 outputs results of the coordinate data A12 multiplied by the input image data G to the first adder 1631, and the third multiplier 1623 outputs results of the coordinate data A13 multiplied by the input image data B to the first adder 1631.

The first adder 1631 outputs a white point adjusting data R'. The white point adjusting data R' is calculated by adding a value of the coordinate data A11 multiplied by the input image data R, a value of the coordinate data A12 multiplied by the input image data G, and a value of the coordinate data A13 multiplied by the input image data B. The white point adjusting data R' may be input to the selector SP.

In addition, input image data R and coordinate data A21 are input to a fourth multiplier 1624, input image data G and coordinate data A22 are input to a fifth multiplier 1625, and input image data B and coordinate data A23 are input to a sixth multiplier 1626.

The fourth multiplier 1624 outputs results of the coordinate data A21 multiplied by the input image data R to a second adder 1632, the fifth multiplier 1625 outputs results of the coordinate data A22 multiplied by the input image data G to the second adder 1632, and the sixth multiplier 1626 outputs results of the coordinate data A23 multiplied by the input image data B to the second adder 1632.

The second adder 1632 outputs a white point adjusting data G'. The white point adjusting data G' is calculated by adding a value of the coordinate data A21 multiplied by the input image data R, a value of the coordinate data A22 multiplied by the input image data G, and a value of the coordinate data A23 multiplied by the input image data B. The white point adjusting data G' may be input to the selector SP.

In addition, input image data R and coordinate data A31 are input to a seventh multiplier 1627, input image data G and coordinate data A32 are input to an eighth multiplier 1628, and input image data B and coordinate data A33 are input to a ninth multiplier 1629.

The seventh multiplier 1627 outputs results of the coordinate data A31 multiplied by the input image data R to a third adder 1633, the eighth multiplier 1628 outputs results of the coordinate data A32 multiplied by the input image data G to the third adder 1633, and the ninth multiplier 1629 outputs results of the coordinate data A33 multiplied by the input image data B to the third adder 1633.

The third adder 1633 outputs a white point adjusting data B'. The white point adjusting data B' is calculated by adding a value of the coordinate data A31 multiplied by the input image data R, a value of the coordinate data A32 multiplied by the input image data G, and a value of the coordinate data A33 multiplied by the input image data B. The white point adjusting data B' may be input to the selector SP.

According to the present exemplary embodiment, a white point may be converted at a predetermined time interval. Therefore, a voltage applied to a pixel electrode is converted at a predetermined time interval and a liquid crystal may be substantially prevented from hardening. Thus, an afterimage may be substantially minimized.

Figure 12:
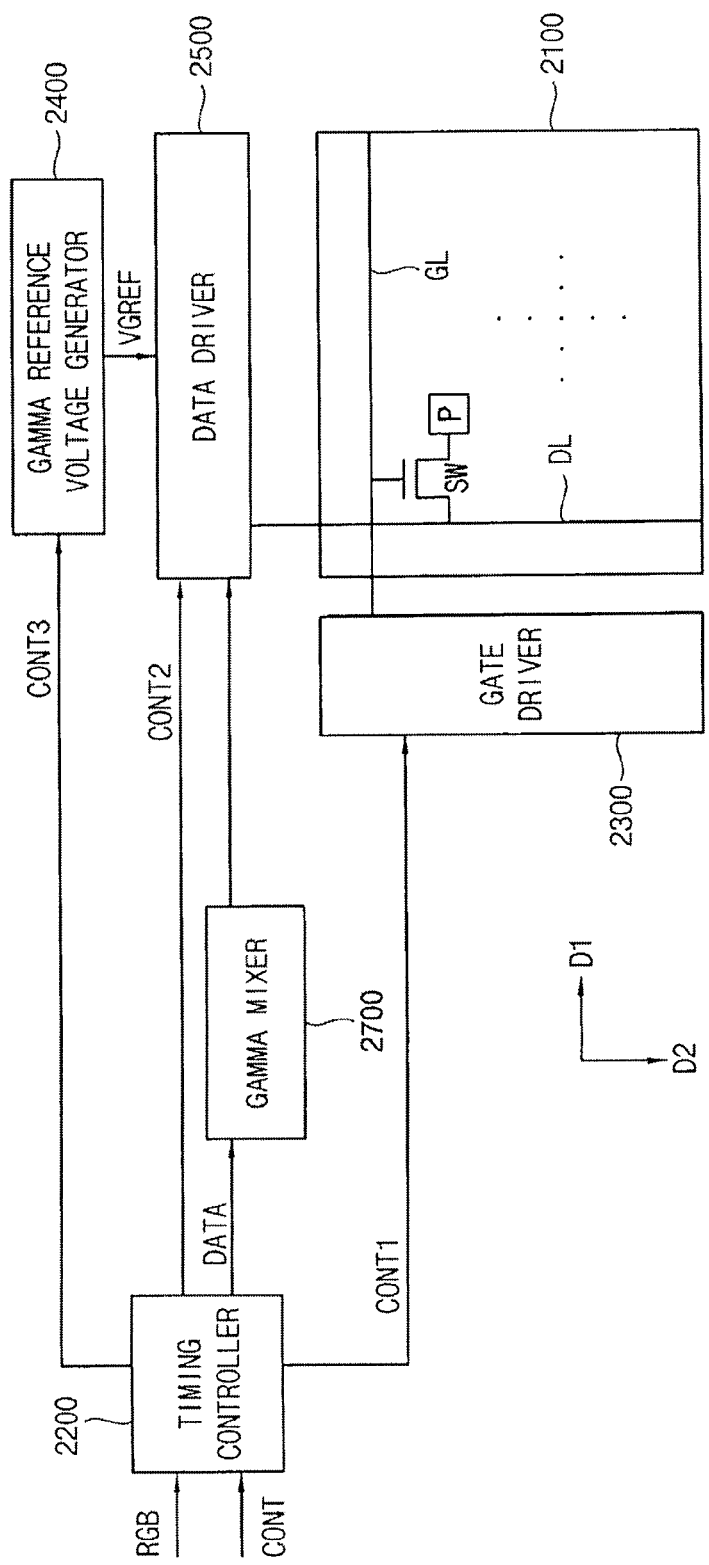
FIG. 12 is a schematic block diagram illustrating a display apparatus according to an exemplary embodiment of the present inventive concept.

FIG. 12 is a block diagram illustrating a display apparatus according to an exemplary embodiment of the present inventive concept.

Referring to FIG. 12, the display apparatus includes a display panel 2100 connected to a display panel driver. The display panel driver includes a timing controller 2200, a gate driver 2300 connected to the timing controller, a gamma reference voltage generator 2400 connected to the timing controller, a data driver 2500 connected to the timing controller and to the gamma reference voltage generator, and a gamma mixer 2700 connected between the timing controller and the data driver.

The display panel 2100 displays an image based on input image data. The display panel 2100 may have a display region on which the image is displayed and a peripheral region adjacent to the display region.

The display panel 2100 includes a plurality of gate lines GL, a plurality of data lines DL and a plurality of sub-pixels P connected to the gate lines GL and the data lines DL. The gate lines GL may extend in a first direction D1 and the data lines DL may extend in a second direction D2 crossing the first direction D1.

Each sub-pixel P may include a switching element SW and a capacitor electrically connected to the switching element SW. The sub-pixels P may be disposed in a matrix form. For example, the switching element SW may be a thin film transistor.

The display apparatus may be a liquid crystal display apparatus and/or an organic light emitting diode display apparatus, for example. The present inventive concept may be applied to various display apparatuses, including those with thin film transistors, but not limited thereto.

The timing controller 2200 receives the input image data RGB and an input control signal CONT from an external apparatus (not shown). The input image data may include red image data R, green image data G and blue image data B. The input control signal CONT may include a master clock signal and a data enable signal. The input control signal CONT may further include a vertical synchronization signal and a horizontal synchronization signal.

The timing controller 2200 generates a first control signal CONT1, a second control signal CONT2, a third control signal CONT3 and a data signal DATA based on the input image data RGB and the input control signal CONT.

The timing controller 2200 generates the first control signal CONT1 for controlling an operation of the gate driver 2300 based on the input control signal CONT, and outputs the first control signal CONT1 to the gate driver 2300. The first control signal CONT1 may include a vertical start signal and a gate clock signal.

The timing controller 2200 generates the second control signal CONT2 for controlling an operation of the data driver 2500 based on the input control signal CONT, and outputs the second control signal CONT2 to the data driver 2500. The second control signal CONT2 may include a horizontal start signal and a load signal.

The timing controller 2200 generates a data signal DATA based on the input image data RGB. The timing controller 2200 outputs the data signal DATA to the data driver 2500.

The data signal DATA is output to the data driver 2500 through the gamma mixer 2700.

The gamma mixer 2700 generates gamma mix data mixing a gamma temporally. The gamma mixer 2700 may include a selector and a temporal gamma part.

The gamma mix data generated by the gamma mixer 2700 is output to the data driver 2500.

In the present exemplary embodiment, the display apparatus includes a grayscale conversion part including the gamma mixer 2700. The gamma mixer 2700 generates a signal displaying different grayscales to the sub-pixels at a predetermined time interval. Thus, a voltage applied to a pixel electrode is converted at a predetermined time interval, so that a liquid crystal may be substantially prevented from hardening. Thus, an afterimage may be substantially minimized.

The timing controller 2200 generates the third control signal CONT3 for controlling an operation of the gamma reference voltage generator 2400 based on the input control signal CONT, and outputs the third control signal CONT3 to the gamma reference voltage generator 2400.

The gate driver 2300 generates gate signals driving the gate lines GL in response to the first control signal CONT1 received from the timing controller 2200. The gate driver 2300 sequentially outputs the gate signals to the gate lines GL.

The gate driver 2300 may be integrated with the peripheral portion of the display panel 2100. Alternatively, the gate driver 2300 may be directly mounted on the display panel 2100, or may be connected to the display panel 2100 as a tape carrier package (TCP) type.

The gamma reference voltage generator 2400 generates a gamma reference voltage VGREF in response to the third control signal CONT3 received from the timing controller 2200. The gamma reference voltage generator 2400 provides the gamma reference voltage VGREF to the data driver 2500. The gamma reference voltage VGREF has a value corresponding to a level of the data signal DATA.

In an exemplary embodiment, the gamma reference voltage generator 2400 may be disposed in the timing controller 2200, or in the data driver 2500.

The data driver 2500 receives the second control signal CONT2 and the data signal DATA from the timing controller 2200 through the gamma mixer 2700, and receives the gamma reference voltages VGREF from the gamma reference voltage generator 2400. The data driver 2500 converts the data signal DATA into data voltages having an analog type using the gamma reference voltages VGREF. The data driver 2500 outputs the data voltages to the data lines DL.

The data driver 2500 may be directly mounted on the display panel 2100, or be connected to the display panel 2100 in a TCP type. Alternatively, the data driver 2500 may be integrated with the display panel 2100.

Figure 13:
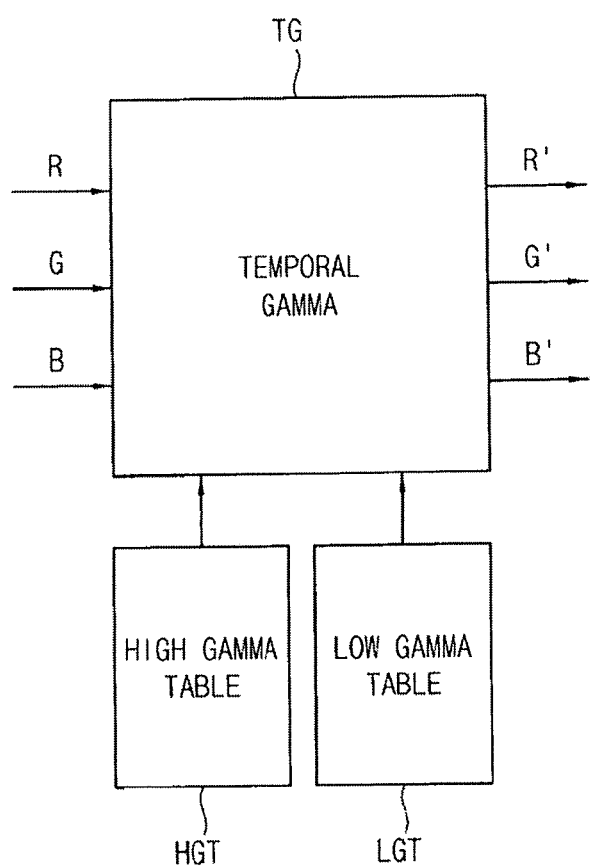
FIG. 13 is schematic block diagram illustrating an exemplary gamma mixer of FIG. 12.

FIG. 13 is block diagram illustrating an exemplary gamma mixer of FIG. 12.

Referring to FIG. 13, a gamma mixer 2700 of the display apparatus according to an exemplary embodiment of the present inventive concept includes a temporal gamma part TG, a high gamma table HGT connected to the temporal gamma part and a low gamma table LGT connected to the temporal gamma part.

Data stored in the high gamma table HGT and the low gamma table LGT and the input image data R, G, B are input to the temporal gamma part TG. Thus, the input image data R, G, B is input to the temporal gamma part TG, and then the temporal gamma part TG generates gamma mix data R', G', B' by using data stored in the high gamma table HGT and the low gamma table LGT.

In the present exemplary embodiment, the gamma mixer 2700 includes the high gamma table HGT and the low gamma table LGT. However, the present inventive concept is not limited thereto. Alternatively, the gamma mixer 2700 may include three or more gamma tables.

The gamma mix data R', G', B' generated from the temporal gamma part TG is output to the data driver 2500. Thus, an image based on a high gamma and an image based on a low gamma may be alternately displayed being temporally divided. Therefore, a voltage applied to a pixel electrode is converted at a predetermined time interval and a liquid crystal portion may be substantially prevented from hardening. Thus, an afterimage may be substantially minimized.

According to the present exemplary embodiment, a white point may be converted at a predetermined time interval and an image based on a high gamma and an image based on a low gamma may be alternately displayed being temporally divided. Therefore, a voltage applied to a pixel electrode is converted at a predetermined time interval and a liquid crystal may remain substantially unhardened. Thus, any afterimage may be substantially avoided.

The foregoing is illustrative of the present invention and is not to be construed as limiting thereof. Although exemplary embodiments of the present invention have been described, those of ordinary skill in the pertinent art will readily appreciate that many modifications are possible in the exemplary embodiments without materially departing from the novel teachings and advantages of the present invention. Accordingly, all such modifications are intended to be included within the scope of the present invention as defined in the appended claims. Therefore, it is to be understood that the foregoing is illustrative of the present invention, which is not to be construed as limited to the specific exemplary embodiments disclosed, and that modifications to the disclosed exemplary embodiments, as well as other exemplary embodiments, are intended to be included within the scope of the appended claims. The present inventive concept is defined by the following claims, with equivalents of the claims to be included therein.

What is claimed is:

1. A display apparatus comprising:
a display panel including a pixel comprising a plurality of color sub-pixels and wherein the display panel is configured to display an image;
a timing controller configured to receive an input image data and to output a data signal;
a grayscale conversion part configured to generate a grayscale conversion signal providing different grayscales to the plurality of color sub-pixels at a predetermined time interval, wherein each grayscale of the different grayscales is based on a color of a corresponding color sub-pixel of the plurality of color sub-pixels, wherein the different grayscales are selected to generate a first color temperature below a user perceived color temperature and a second color temperature above the user perceived color temperature, and wherein the grayscale conversion part comprises: a white point adjuster configured to generate white point conversion data converting a white point at a predetermined time interval based on the input image data; and a gamma mixer configured to generate gamma mix data mixing a gamma based on the input image data, the white point conversion data and gamma data input from outside; and
a data driver configured to receive the grayscale conversion signal from the grayscale conversion part, convert the grayscale conversion signal into a data voltage, and to output the data voltage to the display panel, wherein the grayscale conversion part is connected between the timing controller and the data driver.

2. The display apparatus of claim 1, wherein the white point adjuster comprises:
a color temperature selector configured to generate coordinate data concerning a white point being adjusted; and
a calculator configured to calculate white point adjusting data by using the coordinate data and the input image data.

3. The display apparatus of claim 2, wherein the gamma mixer comprises:
a selector configured to generate selecting data, wherein the selecting data is selected between the input image data and the white point adjusting data; and
the gamma mixer is configured to generate gamma mix data mixing a gamma based on the selecting data and gamma data input from outside.

4. The display apparatus of claim 3, further comprising:
a timer configured to generate an enable signal making the selector select a signal comprising an adjusted white point at a predetermined time interval.

5. The display apparatus of claim 1, wherein the grayscale conversion part comprises a white point adjuster configured to generate white point conversion data converting a white point at a predetermined time interval based on the input image data.

6. The display apparatus of claim 5, wherein the white point adjuster comprises:
a color temperature selector configured to generate coordinate data concerning a white point being adjusted;

a calculator configured to calculate white point adjusting data by using the coordinate data and the input image data; and a selector configured to generate selecting data, wherein the selecting data is selected between the input image data and the white point adjusting data.

7. The display apparatus of claim 6, further comprising:
a timer configured to generate an enable signal making the selector select a signal comprising an adjusted white point at a predetermined time interval.

8. The display apparatus of claim 1, wherein the display apparatus grayscale conversion part comprises a gamma mixer configured to generate gamma mix data mixing a gamma based on the input image data and gamma data input from outside.

9. A method of driving a display panel, the method comprising:

Inputting an input image data comprising a plurality of color components;

generating a grayscale conversion signal displaying different grayscales to a plurality of color sub-pixels of a pixel at a predetermined time interval, wherein each of the different grayscales for the plurality of color sub-pixels is based at least in part on a color of the corresponding color sub-pixel and a color component of the input image data, wherein the different grayscales are selected to generate a first color temperature below a user perceived color temperature and a second color temperature above the user perceived color temperature, and wherein generating the grayscale conversion signal comprises: generating white point conversion data converting a white point at a predetermined time interval based on the input image data; and generating gamma mix data mixing a gamma based on the input image data, the white point conversion data and gamma data input from outside;

receiving the grayscale conversion signal at a data driver from a grayscale conversion part connected between a timing controller and the data driver;

converting the grayscale conversion signal to a data voltage; and outputting the data voltage to the display panel.

10. The method of claim 9, wherein generating the white point conversion data comprises:

generating coordinate data concerning a white point being adjusted; and calculating white point adjusting data by using the coordinate data and the input image data.

11. The method of claim 10, wherein generating the gamma mix data comprises:

generating selecting data, wherein the selecting data is selected between the input image data and the white point adjusting data; and generating gamma mix data mixing a gamma based on the selecting data and gamma data input from outside.

12. The method of claim 11, wherein generating the selecting data further comprises generating an enable signal making a selector select a signal comprising an adjusted white point at a predetermined time interval.

13. The method of claim 11, wherein generating the grayscale conversion signal comprises generating white point conversion data converting a white point at a predetermined time interval based on the input image data.

14. The method of claim 13, wherein generating white point conversion data comprises:

generating coordinate data concerning a white point being adjusted;

calculating white point adjusting data by using the coordinate data and the input image data; and generating selecting data, wherein the selecting data is selected between the input image data and the white point adjusting data.

15. The method of claim 14, wherein generating selecting data further comprises generating an enable signal making the selector select a signal comprising an adjusted white point at a predetermined time interval.

16. The method of claim 11, wherein generating the grayscale conversion signal comprises generating gamma mix data mixing a gamma based on the input image data and gamma data input from outside.

* * * * *